United States Patent [19]
Tibbs

[11] 3,840,199
[45] Oct. 8, 1974

[54] AIRCRAFT
[76] Inventor: Robert C. Tibbs, Hospital Dr., Cleveland, Miss. 38732
[22] Filed: May 9, 1972
[21] Appl. No.: 251,686

[52] U.S. Cl. ............. 244/40 R, 244/42 CC, 244/52
[51] Int. Cl. ............................................ B64c 21/02
[58] Field of Search............ 244/3.21, 3.22, 6, 12 R, 244/12 C, 12 B, 12 D, 23 R, 23 B, 23 C, 23 D, 35 R, 40 R, 42 R, 42 CC, 42 CF, 52, 123, 130, 41, 73; 114/67 A

[56] References Cited
UNITED STATES PATENTS

| | | | |
|---|---|---|---|
| 1,704,753 | 3/1929 | Many | 244/6 |
| 2,396,911 | 3/1946 | Anxionnaz et al. | 244/73 R |
| 2,568,812 | 9/1951 | Lee | 244/42 CC |
| 2,868,479 | 1/1959 | Kadosch et al. | 244/42 CC |
| 3,161,377 | 12/1964 | Balluff | 244/52 |
| 3,176,463 | 4/1965 | Bauger et al. | 244/52 |
| 3,361,386 | 1/1968 | Smith | 244/12 R |
| 3,451,645 | 6/1969 | Wolcott | 244/42 CC |
| 3,469,802 | 9/1969 | Roberts et al. | 244/35 R |
| 3,604,661 | 9/1971 | Mayer | 244/42 CC |

Primary Examiner—George E. A. Halvosa
Assistant Examiner—Jesus D. Sotelo
Attorney, Agent, or Firm—Clarence A. O'Brien; Harvey B. Jacobson

[57] ABSTRACT
An aircraft having an airfoil provided with a plurality of openings on the upper lift surface thereof for directing an airflow over substantially the entire area of that surface. This flow decreases the pressure over the upper lift surface for creating lift forces sufficient to lift the aircraft. The size of the opening is varied by a selectively positionable, pivotal flap. A wall portion cooperating with the flap to form the opening may have one of several configurations including planar, a wedge, and an isosceles triangle with its apex adjacent the outer end of the flap. Further, an upper airfoil shaped member may be arranged at the lift surface of the airfoil adjacent the opening. Openings in various portions of the wings may be inversely positionable from symmetrically arranged openings for controlling the attitude of the aircraft. A propeller is arranged for ducting air to the openings. This propeller, which may be supplemented by at least one compressor stage, has variable and reversible pitch tips for selectively and variably providing thrust bidirectionally along the thrust line of the aircraft. When positioned for reversed thrust, these tips will provide a thrust which counters any thrust created by air escaping from the openings and permit the aircraft to hover. The airfoil is also provided with passages therethrough arranged in symmetrically spaced portions thereof in parallel to the aircraft thrust line. These passages have valves associated therewith and arranged for selectively and inversely directing airflow from the passages for imparting a moment to the airfoil which permits turning of the aircraft.

10 Claims, 15 Drawing Figures

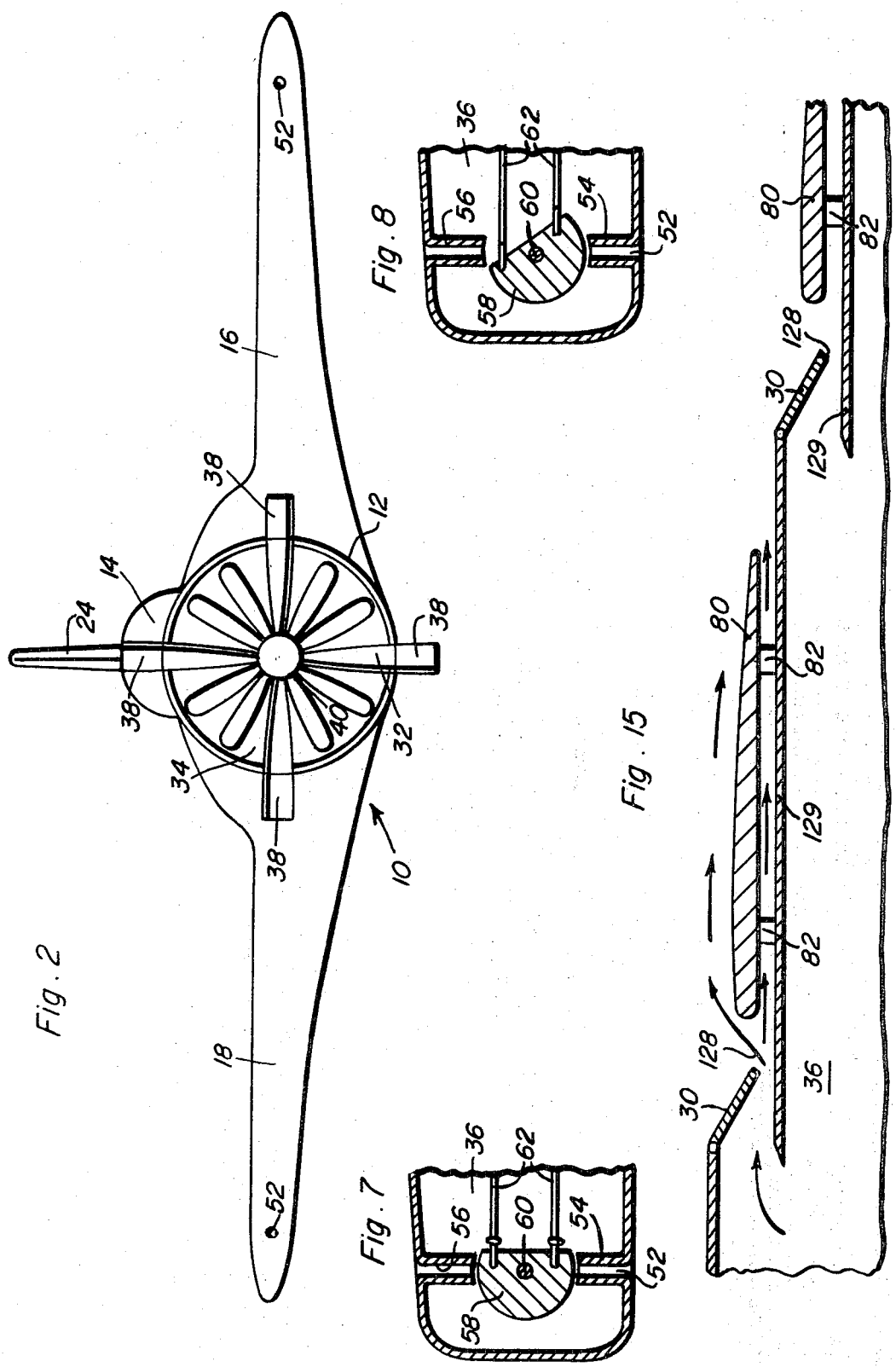

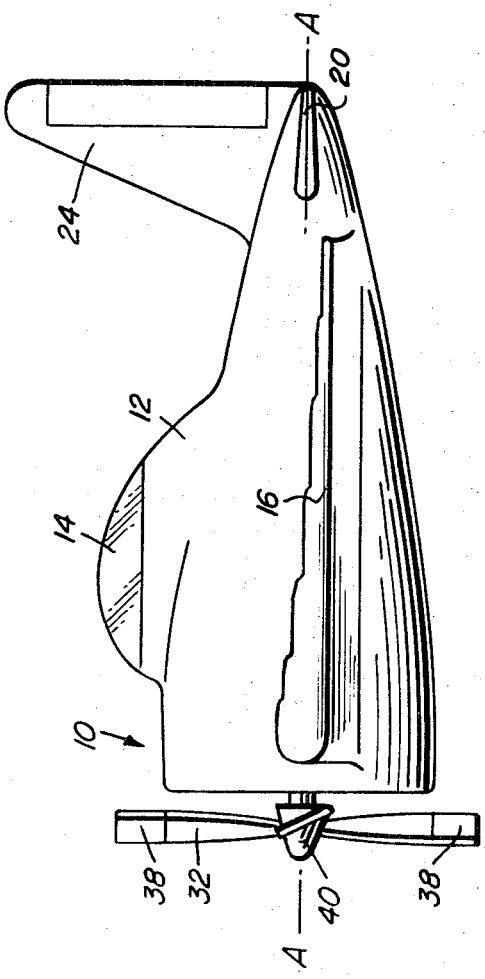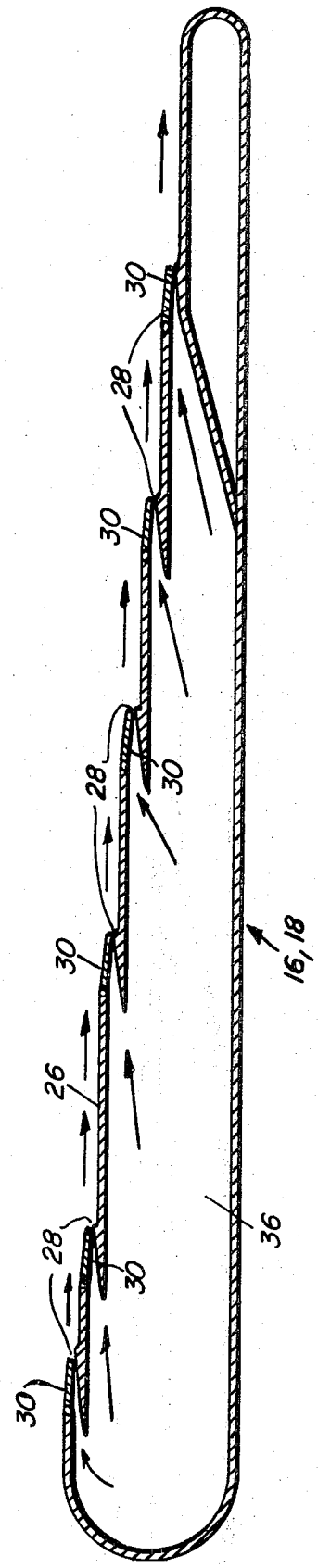
Fig. 6
Fig. 3
Fig. 4

AIRCRAFT

BACKGROUND OF THE INVENTION

1. Field of the Invention

This invention relates to an aircraft, and particularly to an airplane capable of horizontal attitude, vertical takeoff and landing by means of lift forces created by the movement of air over the upper lift surface of a horizontal airfoil. The movement of air is provided other than by the movement of the airfoil relative to ambient air.

2. Description of the Prior Art

As has long been known, lift forces are created on a horizontal airfoil by so configuring the airfoil that air passes over the upper surface thereof in such a manner as to decrease the pressure over the upper surface to a value lower than the pressure adjacent the lower surface of the airfoil. It has also been long recognized that the flow of air over the upper surface of the airfoil may be originated in a manner other than by relative movement of the airfoil with respect to the ambient air. Known airfoils attempting to provide a flow of air over the upper surface of an airfoil by means other than such relative movement have invariably resorted to the use of symmetrical, generally cupshaped airfoils. An example of such an airfoil may be found in U.S. Pat. No. 3,463,417. The reason for the symmetrical airfoils is that only in this manner could hovering capabilities be achieved for the aircraft. If the flow of air over the upper surface of the airfoil is not symmertical, a thrust will be created in a predetermined direction.

SUMMARY OF THE INVENTION

It is an object of the present invention to provide a vertical takeoff and landing aircraft which has unsymmetrical airflow over the upper surface of a horizontal airfoil, but is still capable of hovering.

It is another object of the present invention to provide a vertical takeoff and landing aircraft which may take off and land while in horizontal or flying attitude.

It is yet another object of the present invention to provide such an aircraft which may be in the general configuration of a conventional airplane, and which has general aerodynamic capabilities of conventional airplanes and particularly gliding capabilities.

These and other objects are achieved according to the present invention by providing an aircraft including an airfoil having a surface with means provided thereon for directing a fluid flow over substantially the entire area thereof and decreasing the pressure thereover for creating lift forces sufficient to lift the aircraft. Means are provided on the aircraft for supplying fluid to the directing means.

According to a preferred embodiment of an airfoil according to the present invention, the directing means has at least one opening provided on the upper airfoil surface, and means for varying the size of the opening. Advantageously, there are a plurality of openings arranged about the area of the airfoil surface, and the varying means is a selectively positionable, pivotal flap for each opening. At least one opening in one portion of the airfoil surface is selectively positionable inversely to at least one opening in a symmetrically spaced portion of the airfoil surface for controlling the attitude of the aircraft.

To permit the aircraft to hover, means are provided for selectively and variably providing thrust bidirectionally along the thrust line of the aircraft. This thrust providing means may be at least one variable and reversible pitch tip on a propeller which forms at least a portion of the supplying means. The propeller cooperates with means for ducting fluid therefrom to the directing means. Alternatively, the supplying means may further have at least one compressor stage arranged in the ducting means.

The airfoil is advantageously provided with passages therethrough arranged in symmetrically spaced portions thereof and substantially parallel to the thrust line. Means are associated with these passages for selectively and inversely directing fluid flow from the passages for imparting a moment to the airfoil and, thus, the aircraft. This moment is utilized in turning the aircraft, particularly during hovering and low speed flying.

In one preferred embodiment according to the present invention, there are a pair of airfoils connected to a fuselage, and the ducting means is arranged partially in the fuselage and partially in the airfoils. Alternatively, other configurations may be employed that generally correspond to conventional configurations of airplanes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a front elevational view showing the aircraft of FIG. 1.

FIG. 3 is a side elevational view showing the aircraft of FIGS. 1 and 2.

FIG. 4 is a transverse sectional view showing an airfoil of the aircraft of FIGS. 1 to 3.

FIG. 6 is a fragmentary, top plan view showing a modified construction of an aircraft according to the present invention.

FIGS. 7 and 8 are fragmentary, plan, sectional views showing a wing tip control assembly according to the present invention.

FIGS. 11 to 15 are fragmentary, transverse sectional views showing several embodiments of airfoil exit openings according to the present invention.

DESCRIPTION OF THE PREFERRED EMBODIMENTS

Figure 1:
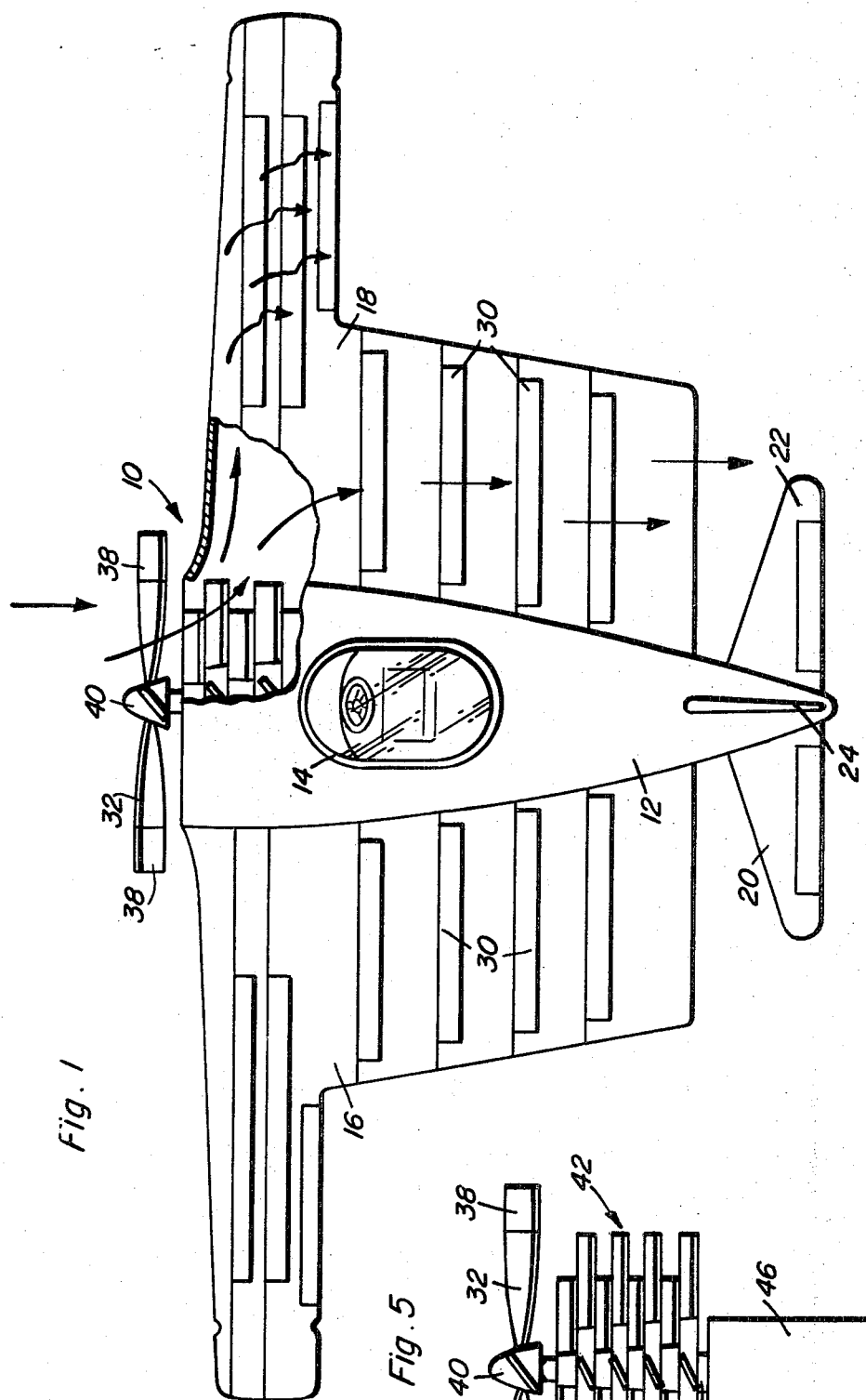
FIG. 1 is a top plan view, partly cut away, showing an aircraft according to the present invention.

FIGS. 1 to 3 of the drawings show an aircraft 10 according to the present invention having a fuselage 12 provided with a cockpit 14, a pair of wings 16, 18, stabilizers 20, 22, and a rudder 24. The general configuration of aircraft 10 may be comparable to conventional airplanes.

Referring now to FIG. 4 in addition to FIGS. 1 to 3, wings 16, 18, which are preferably horizontal airfoils, each has an upper surface 26 provided with a plurality of openings 28 defining exit ports and arranged for directing a flow of a fluid such as air over substantially the entire area of surface 26. This airflow will decrease the pressure over surface 26 and create lift forces on wings 16, 18. By proper design, these lift forces may be sufficient to lift aircraft 10. Selectively positionable flaps 30 are pivotally mounted at openings 28 for varying the size of the exit ports.

At least one opening 28, and preferably a plurality thereof, in one portion of surface 26 is selectively positionable inversely to at least one opening in a symmetrically spaced portion of surface 26 for controlling the attitude of aircraft 10. Flaps 30 may have a macro-control settable from cockpit 14. This control would have fixed settings of, for example, 1/2 inch intervals. This control may be actuated from a wheel or stick (not shown) arranged in cockpit 14. The connections between such a wheel or stick and flaps 30 are not shown, but may be of any conventional, well-known construction. Flaps 30 may also have micro-control which may also be actuated by the wheel or stick. This control may increase or decrease the openings 28 by only, for example, 1/16 inch to 1/4 inch increments. The macro-control may be used primarily or exclusively to control the size of openings 28 as a function of airflow volume desired, while the micro-control may be primarily or exclusively the inversely positionable control to function in the manner of ailerons and tabs on conventional airplanes.

Reducing the size of openings 28 will, other factors being constant, cause an increase in the velocity of air over surface 26 with a resulting increase in lift.

Aircraft 10 is further provided with a propeller 32 for supplying fluid to openings 28. The fluid, or air is ducted from propeller 32 to openings 28 by means of a duct 34 in fuselage 12 and plenums 36 (FIG. 4) in wings 16, 18. Propeller 32 is provided with variable and reversible pitch tips 38 for variably providing thrust bidirectionally along thrust line A—A (FIG. 3) of aircraft 10. This reversible thrust feature pemits aircraft 10 to hover. As is conventional with propellers having variable pitch tips, a mechanism employing, for example, a hydraulic piston (not shown) mounted on a hub 40 with feed through the propeller shaft and with rotation of tips 38 by means of gears or links may be used. The links between tips 38 and hub 40 may pass through hollow blades of propeller 32. Electric motors and direct mechanical drives may also be used in place of the hydraulic piston. Further, it is to be understood that the blades of propeller 32 may also be adjustable if desired for permitting the quantity of air directed into duct 34 to be varied. Low- and high-pitch stops may be provided with the pitch-change mechanism, as is conventional. The removal of the low-pitch stop will permit the tips 38 to move into reverse pitch positions. The high-pitch stop could also be selectively removable if desired. Advantageously, the pitch stops could be eliminated altogether, with a continuous positioning of tips 38 through both the reverse and positive pitch ranges being always available. Since the construction of pitch-change mechanisms is well known, and conventional mechanisms may be used with an aircraft 10 according to the present invention, the construction thereof has not been set out in detail herein.

Figure 5:
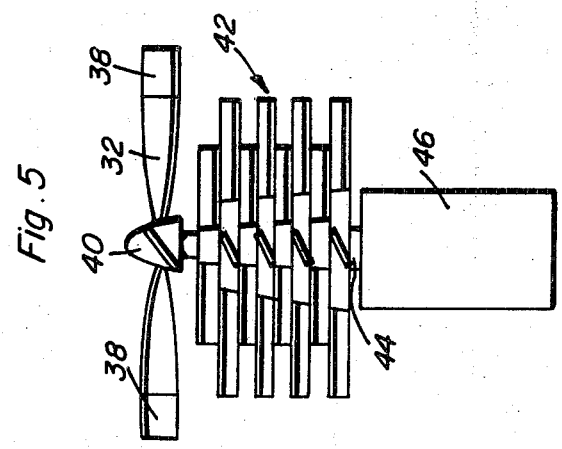
FIG. 5 is a detail view showing a fluid supplying and thrust providing system for use with an aircraft according to FIGS. 1 to 3.

Referring now to FIG. 5 of the drawings, in addition to propeller 32, there may be provided one or more compressor stages 42 arranged on a propeller shaft 44 which is operably connected in a known manner to a conventional aircraft engine 46. Engine 46 may be of any suitable, known type, including internal combustion, gas turbine, and the like. Compressor stages 42 are advantageously arranged in duct 34 for supplementing the airflow creating capabilities of propeller 32.

As an alternative to the arrangement for aircraft 10 shown in FIGS. 1 to 3, an aircraft according to the present invention may have the configuration shown in FIG. 6 of the drawings. In this modification, airfoils 48, 50 extend to the tail portion of a fuselage 12 with the resulting elimination of stabilizers 20, 22.

FIGS. 7 and 8 of the drawings show an advantageous feature of the present invention wherein each airfoil, or wing 16, 18, is provided with at least one passage 52 therethrough, and arranged in symmetrically spaced portions thereof and substantially parallel to thrust line A—A. These passages 52 are preferably arranged in the tips of the airfoils, and may be formed by passage portions 54, 56. Valves 58 may be pivotally mounted between portions 54, 56 as by pins 60 for actuation by control lines 62 for selectively and inversely directing airflow from plenum 36 and out passages 52 for imparting a moment to the airfoil. That is, valve 58 will be positioned in a known manner to direct airflow out of portion 54 in one tip of the airfoil and from passages 56 in the top of another airfoil. The resulting moment will permit the aircraft 10 to turn about its yaw axis even while hovering. Lines 62 may be connected in a conventional manner to rudder pedal (not shown). In addition, the micro-control referred to above may be employed to back the aircraft simultaneously with the moment applied by use of passages 52. It is also to be understood that conventional ailerons may be used on the airfoils if so desired.

Figure 9:
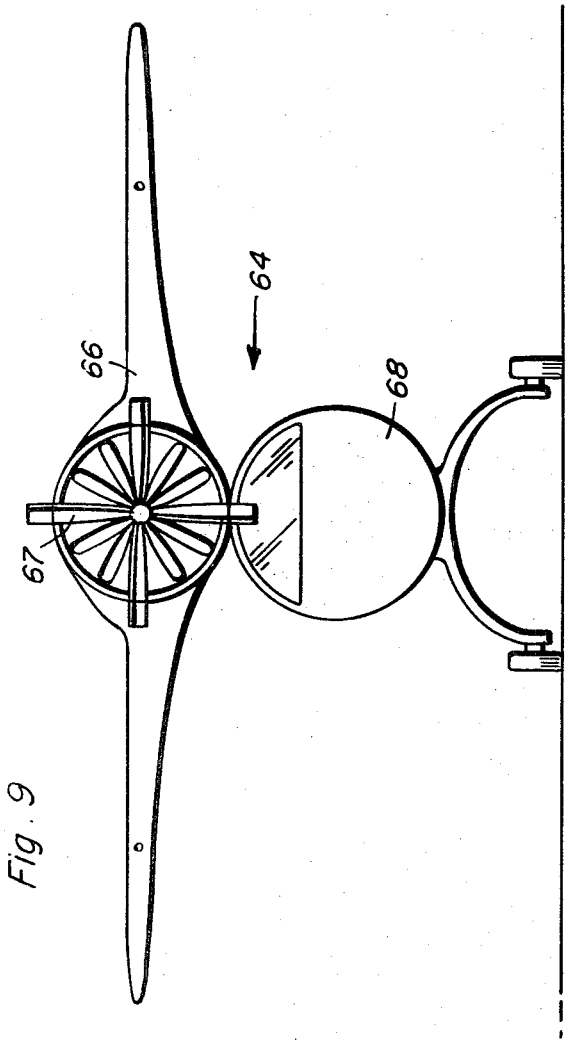
FIGS. 9 and 10 are front elevational views showing modified embodiments of aircraft according to the present invention.
Figure 10:
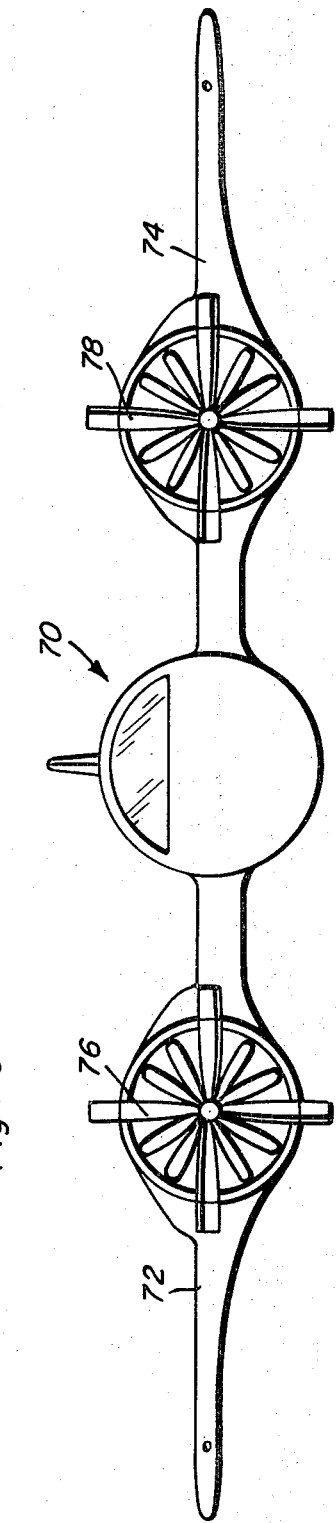

FIG. 9 of the drawings shows an aircraft 64 according to the present invention in the form of a single engine, high wing monoplane having a single airfoil 66 and propeller 67 arranged above a fuselage 64. FIG. 10 of the drawings shows a multiengine aircraft 70 according to the present invention having a pair of airfoils 72, 74 provided with engines driving propellers 76, 78, respectively. Airfoils 66, and 72, 74 of aircraft 64, 70 have openings (not shown) in the upper surface of respective airfoils 66 and 72, 74 which function in a like manner to openings 28 of aircraft 10. Aircrafts 64, 70 operate in an identical manner to aircraft 10, the only difference being changes in configuration.

In yet another alternative embodiment of the present invention (not shown) a cockpit may actually form part of the airfoil. The different configurations realizable within the scope of the present invention are practically limitless, with even, for example, saucer-shaped airfoils being possible.

Figure 11:
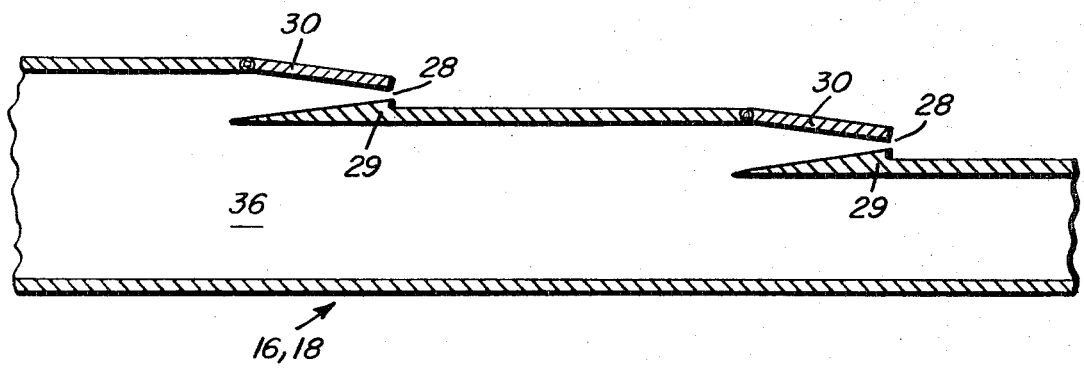
Figure 12:
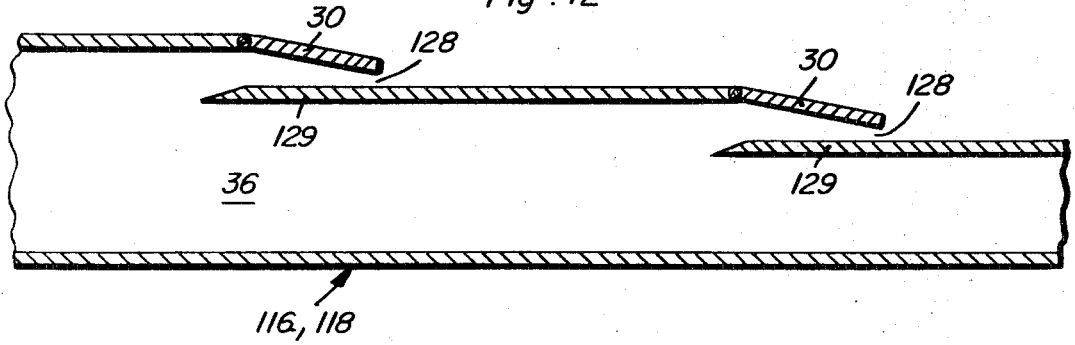
Figure 13:
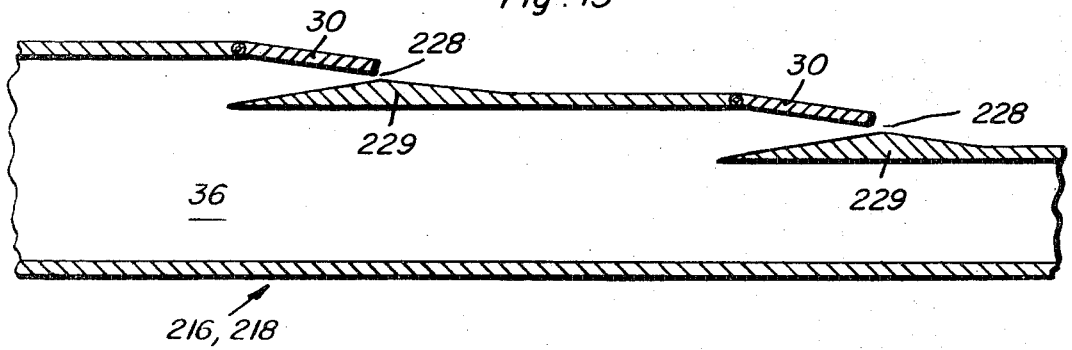
Figure 14:
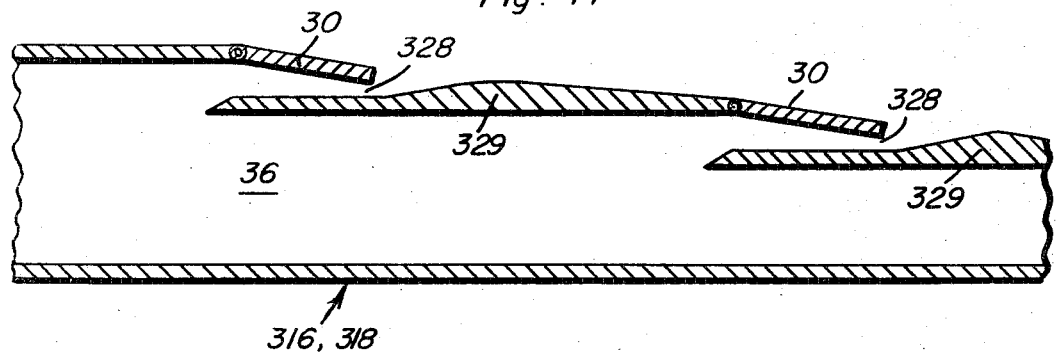

The exit ports defined by openings 28 may take on a variety of configurations and arrangements. FIG. 11 shows in detail the arrangement illustrated in FIG. 4. In this embodiment, the wall portion arranged opposite flap 30 for defining opening 28 is a wedge-shaped portion 29 inclined away from surface 26 in the direction of fluid flow. In FIG. 12, an opening 128 is shown defined by a planar wall portion 129, while in FIG. 13 an opening 228 is defined by a substantially isosceles triangle having its apex adjacent the outer end of flap 30. Finally, FIG. 14 shows another possible configuration for the exit ports wherein the lift surface adjacent an opening 328 is defined by a wall portion 329 in the form of an upper airfoil surface. Each of the configurations shown in FIGS. 11 to 14 of the drawings will provide a different lift for a given airflow out of the respective opening. Specifically, the construction of the embodiment of FIG. 11 will reduce the pressure over the lift surfaces of an airfoil 16, 18 more than the construction of FIG. 12 will reduce the pressure over the lift surfaces of an airfoil 116, 118. The airfoil-like configurations of the embodiments illustrated in FIGS. 13 and 14 will in a like manner affect the airflow over the lift surfaces of airfoils 216, 218, and 316, 318, respectively. In particular, the configuration of the wall portions 229 and 329 will cause a flow on a reduced scale similar to that which results when a conventional airfoil moves relative to air.

FIG. 15 shows yet another embodiment of an airfoil according to the present invention. Basically, the embodiment of FIG. 15 is like that of FIG. 12, but with a member 80 arranged on wall portion 129 and spaced therefrom as by struts 82. Member 80 is preferably formed in the shape of a conventional airfoil. High velocity fluid (air) from exit port 128 passes over both the upper and lower airfoil surfaces of member 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An aircraft comprising, in combination:
   a. an airfoil having a surface;
   b. means provided on said surface for directing a fluid flow over substantially the entire area thereof and decreasing the pressure thereover for creating lift forces sufficient by themselves to lift the aircraft, the directing means including a plurality of openings provided and arranged about the area on said surface, and means for varying the size of said opening;
   c. means for supplying fluid to the directing means, the supplying means including a propeller and means for ducting fluid from said propeller means to the directing means; and
   d. means for selectively and variably providing thrust bidirectionally along a thrust line and the thrust providing means including at least one variable and reversible pitch tip on said propeller arranged for permitting the aircraft to selectively move along the thrust line and to hover, the directing means further including means for imparting a moment to the airfoil having a passage arranged passing through the airfoil parallel to a thrust line thereof, and a valve inserted in the passage, whereby at least one opening of the passage is selectively positionable inversely to at least one symmetrically spaced opening for controlling the attitude of the aircraft.

2. A structure as defined in claim 1, wherein the varying means is a selectively positionable, pivotally mounted flap.

3. A structure as defined in claim 2, wherein said supplying means further includes at least one compressor stage arranged in the ducting means.

4. An aircraft comprising, in combination:
   a. an airfoil having a surface, said airfoil being provided with passages therethrough arranged in symmetrically spaced portions thereof and substantially parallel to a thrust line, and means including valves arranged in the passages for selectively and inversely directing fluid flow from the passages for imparting a moment to said airfoil;
   b. means provided on said surface for directing a fluid flow over substantially the entire area thereof and decreasing the pressure thereover for creating lift forces sufficient by themselves to lift the aircraft;
   c. means for supplying fluid to the directing means, the supplying means including a propeller and means for ducting fluid from said propeller means to the directing means, said supplying means further including at least one compressor stage arranged in the ducting means; and
   d. means for selectively and variably providing thrust bidirectionally along a thrust line and the thrust providing means including at least one variable and reversible pitch tip on said propeller arranged for permitting the aircraft to selectively move along the thrust line and to hover.

5. A structure as defined in claim 4, further including a fuselage, and wherein there are a pair of airfoils connected to said fuselage, the ducting means being arranged partially in said fuselage and partially in said airfoils.

6. An airfoil comprising, in combination:
   a. an airfoil surface; and
   b. means provided on said surface for directing a fluid flow in the direction of a thrust line of the airfoil over substantially the entire area thereof and decreasing the pressure thereover for creating lift forces sufficient by themselves to lift an aircraft, the directing means including at least one opening provided on said surface, and means for varying the size of said opening, the directing means further including means for imparting a moment to the airfoil having a passage arranged passing through the airfoil parallel to a thrust line thereof, and a valve inserted in the passage, whereby at least one opening of the passage is selectively positionable inversely to at least one symmetrically spaced opening for controlling the attitude of the aircraft.

7. A structure as defined in claim 6, wherein the varying means is a selectively positionable, pivotally mounted flap.

8. An airfoil comprising, in combination:
   a. an airfoil surface, said airfoil being provided with passages therethrough arranged in symmetrically spaced portions thereof and substantially parallel to a thrust line, and means including valves arranged in the passages for selectively and inversely directing fluid flow from said passages for imparting a moment to said airfoil; and
   b. means provided on said surface for directing a fluid flow in the direction of a thrust line of the airfoil over substantially the entire area thereof and decreasing the pressure thereover for creating lift forces sufficient by themselves to lift an aircraft.

9. An aircraft comprising, in combination:

a. an airfoil having a surface;
b. means provided on said surface for directing a fluid flow over substantially the entire area thereof and decreasing the pressure thereover for creating lift forces sufficient to lift the aircraft; and
c. means for supplying fluid to the directing means, the directing means including an opening provided in the airfoil surface, and said surface has a member arranged thereon and formed in the shape of a conventional airfoil, said member arranged spaced from said surface adjacent the opening for permitting a high velocity stream of fluid from said opening to pass over both an upper and a lower airfoil surface thereof.

10. An airfoil comprising, in combination:

a. an airfoil surface; and
b. means provided on said surface for directing a fluid flow in the direction of a thrust line of the airfoil over substantially the entire area thereof and decreasing the pressure thereover for creating lift forces sufficient by themselves to lift an aircraft, the directing means including an opening provided in the airfoil surface, and said surface havin a member arranged thereon and formed in the shape of a conventional airfoil, said member arranged spaced from said surface adjacent the opening for permitting a high velocity stream of fluid from said opening to pass over both an upper and a lower airfoil surface thereof.

* * * * *